UNITED STATES PATENT OFFICE.

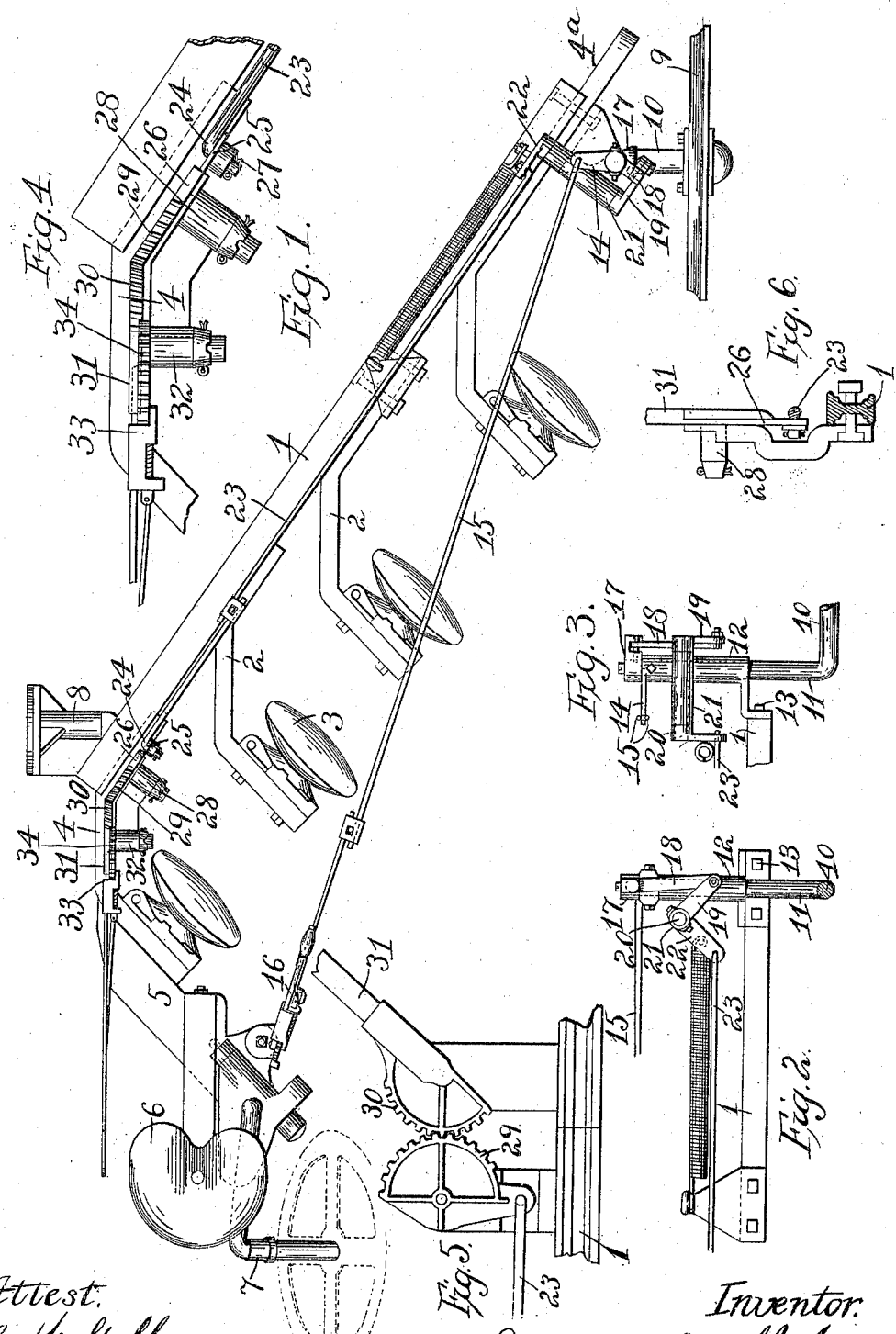

NEWELL SANDERS, OF CHATTANOOGA, TENNESSEE.

PLOW.

951,702.      Specification of Letters Patent.      Patented Mar. 8, 1910.

Application filed July 25, 1908. Serial No. 445,370.

*To all whom it may concern:*

Be it known that I, NEWELL SANDERS, a citizen of the United States, residing at Chattanooga, Tennessee, have invented certain new and useful Improvements in Plows, of which the following is a specification.

My invention relates to plows and particularly to means for raising and lowering the front end of the plow frame, my object being to provide a simple and effective construction in which the connections leading from the operating lever to the front end of the plow will conform as nearly as possible to the angular shape of the plow beam or frame lying closely against the same.

The invention consists of the features, combination and arrangement of parts hereinafter described and particularly pointed out in the claims.

In the accompanying drawings,—Figure 1 is a plan view of a plow of the disk type embodying my invention; Fig. 2 is a detailed view of means at the front end of the plow frame for raising and lowering the same; Fig. 3 is a detailed view of the parts shown in Fig. 1. Fig. 4 is a detail view of the geared operating connection. Figs. 5 and 6 are detail views.

I have shown my invention as embodied in a plow of the disk type, but it will be understood that I do not restrict myself in this respect, as it may be applied with equal facility to plows of other forms than that shown.

In the drawings, 1 indicates the plow frame member having a plurality of beams, 2, connected therewith, on which are supported the disks 3 of substantially ordinary form. The frame member is connected at its rear end with a beam member 4 of angular form, which, in turn, is connected with an extension 5 upon which the seat 6 is supported and from which the rear wheel is also supported by means of an axle 7.

The land-side wheel is supported from a bracket 8 extending laterally from the main frame and the front wheel 9 is carried by a horizontal axle 10 connected or formed with a standard 11, which passes up through a bearing 12 bolted to the main frame or front beam 4ᵃ at 13. The upper end of this standard 11 has bolted thereto an arm 14 extending laterally therefrom, with which connects a rod 15 extending rearwardly and joined to an operating lever 16, suitably pivoted on the frame within convenient reach of the driver. By this operating lever and connections the front wheel may be turned into any desired angular position for directing the plow. In order to raise and lower the front of the plow, I provide the following mechanism: On the upper end of the standard 11 is fixed a boss or collar 17 to which is pivotally connected a link 18 extending downwardly and pivoted to an arm 19 on a rock shaft 20, which is journaled in a bearing 21 fixed to or formed with the upright bearing 12 before mentioned. This rock shaft at its inner ends has fixed thereto an arm 22, to which is connected a rod 23 extending along the main frame 1 substantially parallel therewith. At its rear end this rod 23 is bent laterally at 24 and extends through an eye 25 of a lever 26. The lever 26 is journaled at 28 on the inner side of the frame and in close proximity to the frame 1. This lever is provided with teeth at 29 and these teeth are engaged by teeth 30 on an operating lever 31, which is pivoted at 32 to the frame and is adapted in the ordinary manner to be set in various radial positions in respect to its pivot and there held by a dog or pawl 33 on the lever engaging a segment 34 on the frame.

It will be observed that the lever 26 is arranged parallel with the adjacent part of the frame to which it is connected, and this is true also of the pivoted end of the lever 31, and it will be observed also that as the main frame 1 and the beam member 4 are angularly arranged in respect to each other, a special form of intermeshing teeth on the levers 26 and 31 is provided, these being as shown inclined or beveled so that the movement of the lever 31 will be transmitted to the lever 26, and thence to the adjusting mechanism at the front of the plow frame, notwithstanding the fact that the operating lever and the connections leading therefrom are arranged in different vertical planes in respect to each other. By means of the beveled or inclined teeth, I am enabled to transmit the movement from the operating lever to the front of the plow for adjusting the same through connections which conform to the angular shape of the plow frame. I thus secure strength and simplicity and an arrangement of parts in protected position to avoid breakage or damage thereto, and place the lever in reach of the driver while sitting in the seat, giving convenience and ease of operation.

Levers of the old style placed at the front end of the plow have been out of the reach of the driver in the seat, or have been excessively long, making the throw at the end too high and the oscillation sidewise dangerous to the driver.

I claim as my invention:—

1. In combination in a plow, a frame extending substantially horizontally and bent laterally, means at the front of the plow for raising and lowering the same, a hand lever, operating in a vertical plane coincident with the line of draft, a connection extending at an inclination to the line of draft to the raising and lowering means, and power transmitting means between the hand lever and said inclined connection, substantially as described.

2. In combination in a plow, a frame extending substantially horizontally and bent laterally, means at the front of the plow for raising and lowering the same, a hand lever and connections between the said hand lever and the said raising and lowering means, said connections conforming substantially to the lateral bend of the plow frame, said connections including the members having the beveled intermeshing teeth, substantially as described.

3. In combination in a plow, a frame of angular form, means at the front of the plow for raising and lowering the same, a hand lever and connections between the said hand lever and the said raising and lowering means, said connections conforming substantially to the angular shape of the plow frame, said connections comprising the hand lever having beveled teeth, a transmitting lever having beveled teeth meshing with those on the hand lever, substantially as described.

4. In combination in a plow a wheel at the front of the same, means at the front of the plow for raising and lowering the said wheel, a hand lever mounted on a horizontal axis, and having a vertically disposed gear with beveled teeth to move about the said horizontal axis in the vertical plane of movement of the lever, a second beveled gear turning on a horizontal axis meshing with the first, and disposed in a vertical plane, at an inclination to the vertical plane of the first gear and a connection extending from the second beveled gear at an inclination to the line of draft to operate the raising and lowering means, substantially as described.

5. In combination in a plow, a disk with means for supporting the same, means at the front of the plow for raising and lowering, a hand lever mounted to move in a vertical plane substantially parallel with the line of draft, and a connection extending from the said lever in a plane in front of the plow disk and at an inclination to the line of draft to operate the raising and lowering means, substantially as described.

6. In combination in a plow, a frame, plow disks arranged as a series at an inclination to the line of draft, a hand lever mounted on a horizontal axis and moving in a vertical plane substantially parallel with the line of draft, and a connection from said hand lever extending in a plane in front of the plow disks and substantially parallel with the inclination of the series of disks, and raising and lowering means at the front of the frame to be operated by the said connection, substantially as described.

7. In combination a frame, means at the front thereof for raising and lowering the same, a hand lever on a horizontal axis and movable in a vertical plane substantially parallel with the line of draft, a gear turning about the horizontal axis and connected with the lever, a second gear arranged in a vertical plane at an inclination to the first gear, and meshing therewith, and a connection extending from the second gear to the raising and lowering means and at an inclination to the line of draft, said gears being mounted on the inner side of the frame, substantially as described.

In testimony whereof, I affix my signature in presence of two witnesses.

NEWELL SANDERS.

Witnesses:
R. W. GATES,
J. W. THOMPSON.